US012786174B2

(12) United States Patent
Rieschl et al.

(10) Patent No.: US 12,786,174 B2
(45) Date of Patent: Nov. 3, 2026

(54) EXECUTING ACCELERATED CRYPTOGRAPHIC OPERATIONS IN AN EMULATED ENVIRONMENT

(71) Applicant: Unisys Corporation, Blue Bell, PA (US)

(72) Inventors: Michael J. Rieschl, Blue Bell, PA (US); David William Schroth, Minneapolis, MN (US); Timothy Eugene Dick, Blue Bell, PA (US); Robert Louis Bergerson, Blue Bell, PA (US); Brian Anton Wegleitner, Blue Bell, PA (US); James Richard Heit, Blue Bell, PA (US); Matthew David Nuechterlein, Blue Bell, PA (US)

(73) Assignee: Unisys Corporation, Blue Bell, PA (US)

( * ) Notice: Subject to any disclaimer, the term of this patent is extended or adjusted under 35 U.S.C. 154(b) by 34 days.

(21) Appl. No.: 18/906,029

(22) Filed: Oct. 3, 2024

(65) Prior Publication Data

US 2026/0100937 A1 Apr. 9, 2026

(51) Int. Cl.

| | |
|---|---|
| ***H04L 9/40*** | (2022.01) |
| ***G06F 9/455*** | (2018.01) |
| ***G06F 21/62*** | (2013.01) |

(52) U.S. Cl.
CPC ....... *H04L 63/0428* (2013.01); *G06F 9/45545* (2013.01); *G06F 21/6218* (2013.01)

(58) Field of Classification Search
CPC ....... H04L 9/06; H04L 9/0631; H04L 9/0637; H04L 9/0822; H04L 9/3239; H04L 63/164; H04L 9/0894; G06F 6/729; G06F 21/57; G06F 21/72; G06C 1/00; H03M 7/40
See application file for complete search history.

(56) References Cited

U.S. PATENT DOCUMENTS

| | | | | |
|---|---|---|---|---|
| 7,369,657 | B2 * | 5/2008 | Eldeeb | H04L 63/164 380/28 |
| 8,850,223 | B1 * | 9/2014 | Helsel | G06F 21/72 713/189 |
| 11,537,421 | B1 * | 12/2022 | Brooker | H04L 9/0894 |
| 2001/0042210 | A1 * | 11/2001 | Blaker | G06F 7/728 712/E9.067 |
| 2013/0145429 | A1 * | 6/2013 | Mendel | G06F 21/57 726/17 |
| 2018/0006806 | A1 * | 1/2018 | Wang | G09C 1/00 |

(Continued)

OTHER PUBLICATIONS

International Search Report and Written Opinion received for PCT Patent Application No. PCT/US2025/049474, mailed on Dec. 10, 2025, 9 pages.

*Primary Examiner* — Dustin Nguyen
(74) *Attorney, Agent, or Firm* — Shook, Hardy & Bacon L.L.P.

(57) ABSTRACT

In various examples, cryptographic operations in a first computing environment are encoded in a packet and executed within a second computing environment. For example, a cryptographic library generates a packet including an indication of the cryptographic operation, a pointer to a memory location storing data, and a status field. The packet causes a second computing environment to perform the cryptographic operation and return the packet including an update to the status field.

20 Claims, 7 Drawing Sheets

(56) References Cited

U.S. PATENT DOCUMENTS

| | | | | |
|---|---|---|---|---|
| 2018/0089467 | A1* | 3/2018 | Pedersen | H04L 9/0631 |
| 2018/0232519 | A1* | 8/2018 | Lin | H04L 9/0894 |
| 2022/0103543 | A1 | 3/2022 | Saha et al. | |
| 2022/0229914 | A1 | 7/2022 | Fabjanski | |
| 2022/0382885 | A1 | 12/2022 | Durham et al. | |
| 2022/0391110 | A1* | 12/2022 | Wang | H03M 7/40 |
| 2023/0115278 | A1 | 4/2023 | Turner et al. | |
| 2023/0269076 | A1* | 8/2023 | Brandt | H04L 9/0822 713/189 |
| 2024/0421972 | A1* | 12/2024 | Wang | H04L 9/06 |
| 2025/0030669 | A1* | 1/2025 | Huntley | H04L 9/3239 |
| 2025/0211421 | A1* | 6/2025 | Kumar | H04L 9/0637 |

* cited by examiner

EXECUTING ACCELERATED CRYPTOGRAPHIC OPERATIONS IN AN EMULATED ENVIRONMENT

BACKGROUND

In various types of networked computing environments, data security is an important concern. For example, encryption of data both in transit and at rest is used to maintain privacy and security for various computer systems. One example of a commonly used cryptographic algorithm is the Advanced Encryption Standard (AES), which is a symmetric cipher that can be used to safely encrypt data. Furthermore, cryptographic algorithms such as AES are being used more frequently as organizational security requirements dictate. However, encryption and decryption operations required by these cryptographic algorithms often cause a noticeable degradation in computer system performance such as on heavily used high-capacity computer systems (e.g., server computer systems, mainframes, cloud computing systems, etc.). Users want the benefits and security of these cryptographic algorithms without any noticeable performance degradation. This requirement is so important that many modern computer processors provide direct hardware-based support for certain cryptographic algorithms. However, not all computing environments are capable of taking advantage of these hardware-assisted implementations and, instead, experience performance degradation from software implementations of these cryptographic algorithms.

SUMMARY

Embodiments described herein are directed to causing, by a first computing environment, cryptographic operations to be executed by a second computing environment. Advantageously, in various embodiments, the systems and methods described are directed towards emulating a first computing environment that includes a cryptographic library that enables an application executing within the first computing environment to utilize hardware-accelerated cryptographic operations natively in a second computing environment that is supporting the first computing environment. Some server computer systems, for example, include specific hardware that enables faster execution of cryptographic operations relative to software implementations. In particular, certain processors provide or otherwise include Advanced Encryption Standard New Instructions (AES-NI), which is a set of hardware instructions to accelerate the performance of AES encryption and decryption operations.

In various embodiments, the first computing environment (e.g., a guest computing environment) does not have access to these hardware instructions that accelerate the performance of cryptographic operations. For example, the instruction set supported by the first computing environment is different than the instruction set supported by the second computing environment (e.g., the host computing environment). Therefore, the systems and methods described are capable of translating instruction from the first computing environment to hardware-accelerated instructions in the second computing environment.

BRIEF DESCRIPTION OF THE DRAWINGS

The present disclosure is described in detail below with reference to the attached drawing figures, wherein.

DETAILED DESCRIPTION

Figure 1:
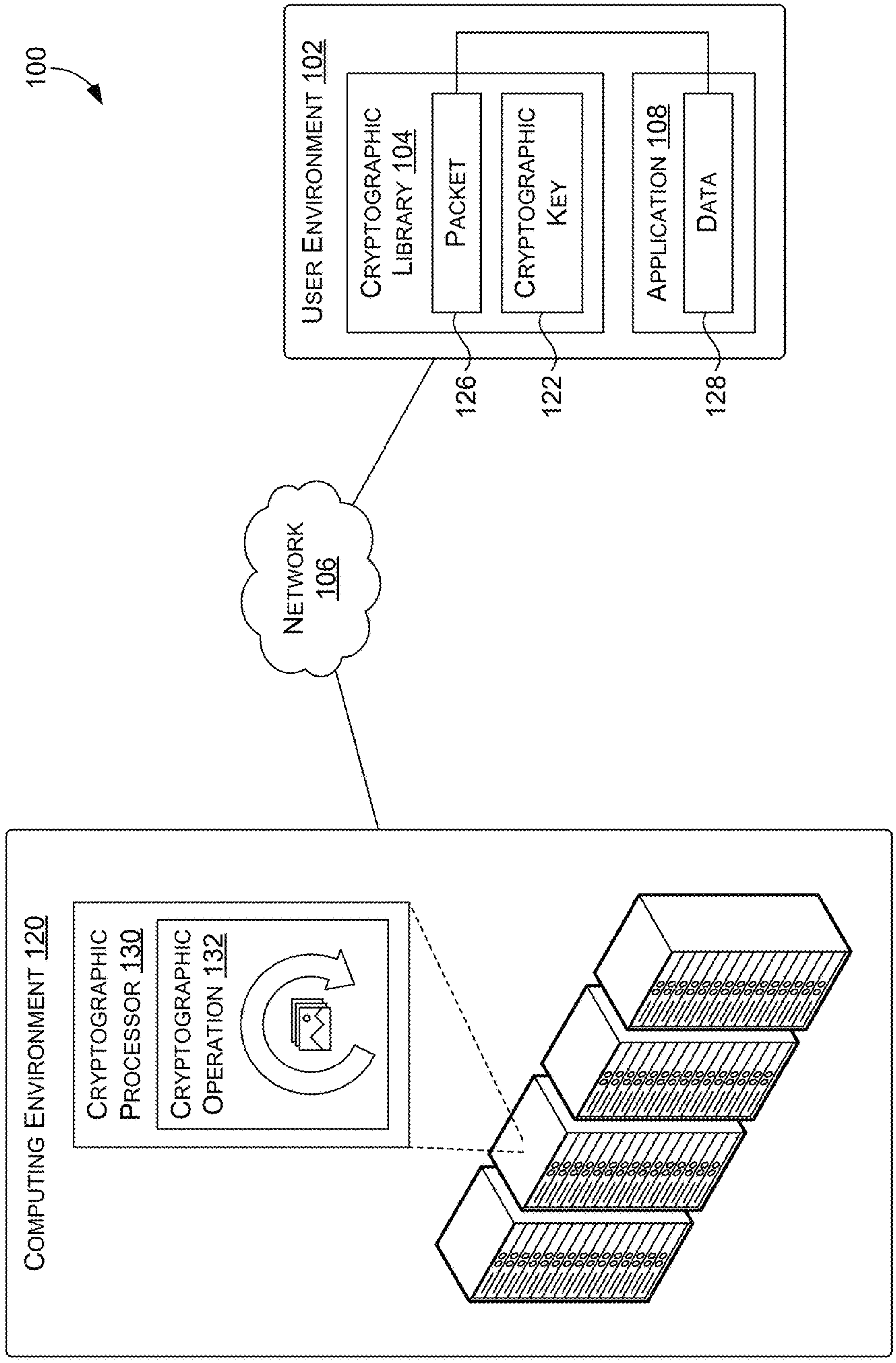
FIG. 1 depicts an environment in which one or more embodiments of the present disclosure can be practiced.

Embodiments described herein generally relate to a cryptographic library that translates a first instruction associated with a first computing environment (e.g., a guest computing environment) to a second instruction associated with a second computing environment that provides the first computing environment access to accelerated cryptographic operations enabled by the second instruction. In accordance with some aspects, the systems and methods described are directed to emulating the first computing environment using hardware of the second computing environment and translating instructions from the first computing environment to instructions of the second computing environment. In some examples, the second computing environment includes or otherwise has access to hardware (e.g., cryptographic processor, graphics processing unit [GPU], coprocessor, etc.) that accelerates or otherwise performs cryptographic operations faster than the implementation within the first computing environment.

Some conventional solutions implement cryptographic algorithms entirely in software. However, these solutions often introduce delay and latency to computing environments given the complexity of the cryptographic operations required to implement these cryptographic algorithms. Furthermore, as more and more data is exposed in networked environments, the need to encrypt data becomes greater. This combination of factors creates several problems, as increasing processing time and latency reduces system utility and may render some systems inoperable.

For example, the Advanced Encryption Standard (AES) is a commonly used cryptographic algorithm to protect data in a networked computing environment. Furthermore, organizational security requirements often dictate that cryptographic algorithms such as AES be used. However, as mentioned above, encryption and decryption operations, such as those for AES, cause a noticeable degradation in computer system performance, which is magnified on heavily used high-capacity computer systems. Users of these systems want the benefit of these cryptographic algorithms without any noticeable performance degradation.

Aspects of the technology described herein provide a number of improvements over existing technologies. For instance, the cryptographic library provides users of the first computing environment with access to hardware-accelerated cryptographic operations that are accessible to the second computing environment. In this manner, the cryptographic library translates or otherwise maps a single instruction in a first instruction architecture associated with the first computing environment to multiple instructions in a second instruction architecture associated with the second computing environment to utilize the hardware-accelerated cryptographic operations in accordance with an embodiment. As mentioned above, in various embodiments, the first instruction architecture associated with the first computing environment does not support the hardware-accelerated instructions that are accessible to the second computing environment. As such, in one example, these translation operations provided by the cryptographic library eliminate the need for the application and/or user to know how to take advantage of the hardware-accelerated cryptographic operations from within the first computing environment.

Furthermore, in an embodiment, the cryptographic library provides a packet interface to allow the first computing environment to communicate cryptographic operations to the second computing environment. In various examples, the packet interface provided by the cryptographic library simplifies the cryptographic operations for the application and/or user and eliminates the need to perform various tasks such as packet validation, data conversion, and/or error handling. For example, the second computing environment passes status information of the cryptographic operations in a packet back to the first computing environment, enabling an operating system of the first computing environment to handle errors without terminating the application.

Turning to FIG. 1, FIG. 1 is a diagram of an operating environment 100 in which one or more embodiments of the present disclosure can be practiced. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether for the sake of clarity. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, some functions can be carried out by a processor executing instructions stored in memory, as further described with reference to FIG. 7.

It should be understood that operating environment 100 shown in FIG. 1 is an example of one suitable operating environment. Among other components not shown, operating environment 100 includes a first computing environment 102, a second computing environment 12, cryptographic library 104, and a network 106. Each of the components shown in FIG. 1 can be implemented via any type of computing device, such as one or more computing devices 700 described in connection with FIG. 7, for example. These components can communicate with each other via network 106, which can be wired, wireless, or both. Network 106 can include multiple networks, or a network of networks, but is shown in simple form so as not to obscure aspects of the present disclosure. By way of example, network 106 can include one or more wide area networks (WANs), one or more local area networks (LANs), one or more public networks such as the Internet, and/or one or more private networks. Where network 106 includes a wireless telecommunications network, components such as a base station, a communications tower, or even access points (as well as other components) can provide wireless connectivity. Networking environments are commonplace in offices, enterprise-wide computer networks, intranets, and the Internet. Accordingly, network 106 is not described in significant detail.

It should be understood that any number of devices, servers, and other components can be employed within operating environment 100 within the scope of the present disclosure. Each can comprise a single device or multiple devices cooperating in a distributed environment. For example, the first computing environment 102 and/or the second computing environment 120 includes multiple server computer systems cooperating in a distributed environment to perform the operations described in the present disclosure.

The first computing environment 102 can be any type of computing device capable of being operated by an entity (e.g., individual or organization) and communicating data (e.g., via the cryptographic library 104) for execution of a cryptographic operation 132 by a cryptographic processor 130 of the second computing environment. The first computing environment 102, in various embodiments, has access to or otherwise maintains data 128 of an application that is used to perform the cryptographic operation 132. In various embodiments, the application 108 is executed within the first computing environment 102, which is an emulated computing environment (e.g., guest operating system) supported by the second computing environment 120 (e.g., host operating system).

In some implementations, first computing environment 102 and/or second computing environment 120 is implemented using the type of computing device described in connection with FIG. 7. By way of example and not limitation, first computing environment 102 and/or second computing environment 120 can be embodied as a personal computer (PC), a laptop computer, a mobile device, a smartphone, a tablet computer, a smart watch, a wearable computer, a personal digital assistant (PDA), a global positioning system (GPS) or device, a video player, a handheld communications device, a gaming device or system, an entertainment system, a vehicle computer system, an embedded system controller, a remote control, an appliance, a consumer electronic device, a workstation, a server computer system, any combination of these delineated devices, or any other suitable device.

In an embodiment, the first computing environment 102 can include one or more processors and one or more computer-readable media that are emulated by the second computing environment. The computer-readable media can also include computer-readable instructions executable by the one or more processors. In an embodiment, the instructions are embodied by one or more applications, such as application 108 shown in FIG. 1. Application 108 is referred to as a single application for simplicity, but its functionality can be embodied by one or more applications in practice.

In various embodiments, the application 108 includes any application capable of facilitating the exchange of information between the first computing environment 102, the cryptographic library 104, and/or the second computing environment. For example, the application 108 transmits the data 128 to the cryptographic library 104 via an emulated processor (e.g., instruction processor [IP]). Continuing this example, the cryptographic library 104 then generates packet 126 and provides the packet 126 to the second computing environment 120. Continuing this example, the second computing environment 120 obtains the packaged data and performs the cryptographic operation 132 based on the packet 126 and returns a status of the cryptographic operation to the first computing environment 102. In some implementations, the application 108 comprises a web application, which can run in a web browser, and can be hosted at least partially on the server-side of the operating environment 100. In addition, or instead, the application 108 can comprise a dedicated application, such as an application being supported by the first computing environment 102 and the cryptographic library 104. In some cases, the application 108 and/or cryptographic library 104 is integrated into the operating system (e.g., as a service, application programming interface [API], etc.).

For cloud-based implementations, for example, the application 108 is utilized to interface with the functionality implemented by the second computing environment 120 to execute the cryptographic operations through the cryptographic library 104. In some embodiments, the components, or portions thereof, of the cryptographic library 104 are implemented on the first computing environment 102 or other systems or devices. Thus, it should be appreciated that the cryptographic library 104, in some embodiments, is provided via multiple devices arranged in a distributed environment that collectively provide the functionality described herein. Additionally, other components not shown can also be included within the distributed environment.

Furthermore, as described below, in various embodiments, the components of the first computing environment 102 are emulated or otherwise visualized by the second computing environment 120 or component thereof, such as an operating system. The terms "emulated," "emulation," "virtual," and "virtualized" do not imply that a particular component does not exist. Rather, these terms refer to a computer component such as a machine, network, storage system, computer, processor, or the like, that is created using software on a physical computer (or a physical distributed computing system like the cloud) in order to emulate the functionality of another separate physical computer component, such as a machine, network, storage system, computer, processor, or the like. Thus, the emulated physical component is referred to as a virtual component.

As illustrated in FIG. 1, the application 108 executing in the first computing environment utilizes the cryptographic library 104 to perform cryptographic operations on the data 128, in accordance with various embodiments. For example, the cryptographic library 104 is provided as a service, API, or other component of an operating system of the first computing environment. As described below, in various embodiments, the cryptographic library 104 generates the packet 126 that is provided to the second computing environment 120 and, as a result of being received by the second computing environment 120, causes the second computing environment 120 to perform the cryptographic operation 132. For example, the cryptographic operation 132 includes generating a cryptographic key 122 based on the data 128 and/or encrypting or decrypting the data 128.

Furthermore, as mentioned above, in various embodiments, the second computing environment 120 emulates, virtualizes, or otherwise provides one or more components of the first computing environment 102. For example, the second computing environment 120 includes an operating system or other executable code that, as a result of being executed by one or more processors of the second computing environment, provides the first computing environment with an emulated processor, input/output device, storage, memory, or other computer component. In an embodiment, the instructions are embodied by an emulation application that emulates the operations and/or instruction architecture of a processor such as the IP. In one example, the emulation application is referred to as a single application for simplicity, but its functionality can be embodied by one or more applications in practice. In various embodiments, the emulation application includes any application capable of emulating a processor and facilitating the exchange of information between the computing environments such as the first computing environment 102 and the second computing environment 120.

In various embodiments, the operating system of the first computing environment 102 obtains an operation, call, or other instruction from the application 108 and executes a machine instruction to the emulated processor (e.g., the IP) and causes the cryptographic library to generate the packet 126. In such embodiments, the emulator, operating system, or other component of the second computing environment 120 obtains and/or extracts information in the packet 126 and causes hardware of the second computing environment 120, such as the cryptographic processor 130, to perform one or more cryptographic operations. For example, the application 108 generates a library call to the cryptographic library 104 to perform an operation. In another example, the application 108 generates a system call to the operating system that, in response to the system call, causes the cryptographic library 104 to perform an operation.

Figure 4:
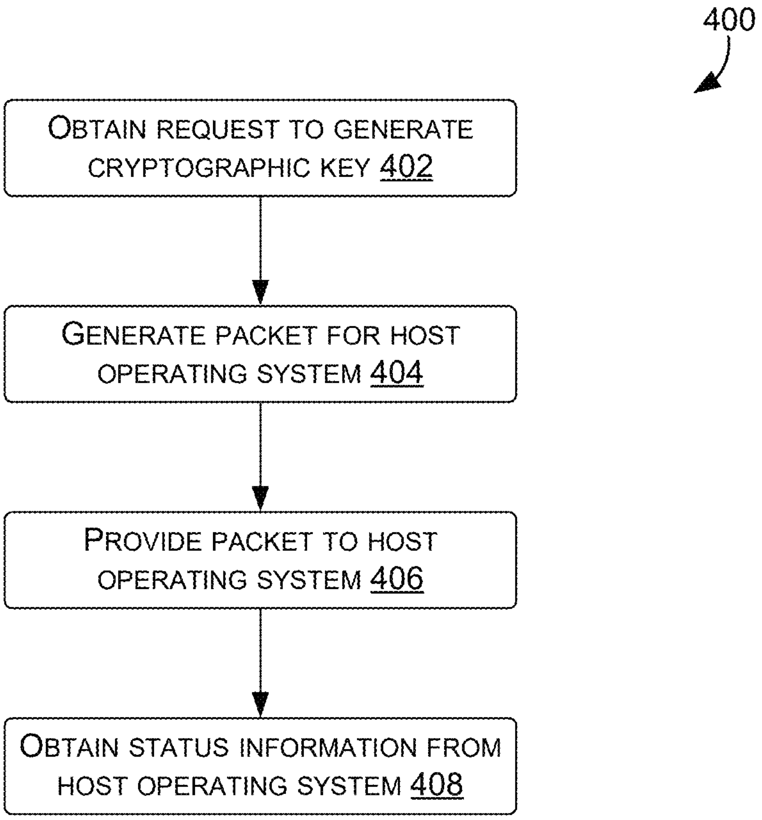
FIG. 4 depicts an example process flow for setting up cryptographic operations to be executed, in accordance with at least one embodiment.

In various embodiments, the cryptographic library 104 (e.g., in response to an instruction from the application 108) generates the packet 126 (e.g., as illustrated in FIG. 4 below) indicating the cryptographic operation (e.g., generate key, encrypt the data 128, decrypt the data 128, or other cryptographic operation) and including a pointer to the data 128. In one example, the cryptographic library 104 or other component of the first computing environment 102 (e.g., the operating system, emulated processor, etc.) passes or otherwise provides the packet 126 to the emulator or other component of the second computing environment 120 (e.g., host operating system) and waits for a status update from the emulator. In various embodiments, the emulator causes the computer hardware (e.g., cryptographic processor 130) to perform the cryptographic operation 132.

In various embodiments, the cryptographic library 104 contains or otherwise includes instructions encoding a software implementation of the cryptographic algorithm (e.g., AES). For example, the cryptographic library 104 includes instructions that implement the Advanced Encryption Standard New Instructions (AES-NI) instruction set, where the AES-NI includes a set of hardware instructions that, as a result of being executed by hardware that supports the instruction set, accelerates the performance of AES encryption and decryption operations (e.g., the cryptographic operation 132).

In various embodiments, the cryptographic library 104 provides a packet interface to communicate cryptographic operations to the second computing environment. For example, as mentioned above, the packet 126 includes an indication of the operation and a pointer to the data 128. Continuing this example, the second computing environment or component thereof such as the operating system and/or emulator causes the cryptographic operation 132 to be performed on the data 128 based on the pointer. In such examples, the data 128 is maintained in a single memory location (e.g., within the memory of the first computing environment 102) and not provided directly to the second computing environment 120. In various embodiments, different functionality is added to the cryptographic library 104 and/or first computing environment by at least generating packet 126 including different information such as different operation information.

Furthermore, in various embodiments, the operation information included in the packet 126 maps a single emulated instruction to multiple instructions in the second computing environment 120. For example, a single encrypt instruction provided to the cryptographic library 104 causes the cryptographic library to generate a plurality of AES-NI instructions corresponding to the encrypt instruction. In addition, the cryptographic library 104, in various embodiments, performs additional operations such as data formatting and data validation once the packet 126 is generated, and/or prior to generating the packet data. For example, the cryptographic library converts data from a nine-bit environment of the first computing environment 102 to an eight-bit environment of the second computing environment 120.

In various embodiments, the cryptographic library 104 performs various validation operations. For example, the cryptographic library 104 and/or other component of the first computing environment 102 performs packet validation (e.g., of the packet 126), bound checking (e.g., determining if the packet length conforms to the size requirements of the second computing environment 120), read and/or write access validation, privilege validation, validating the cryptographic key 122, validating the data 128, or other validation operations to ensure that the cryptographic operation 132 is executable. Furthermore, in some embodiments, the first computing environment 102 and/or component thereof such as the cryptographic library 104 performs a runtime check to determine capabilities available to the second computing environment (e.g., hardware-accelerated operations). For example, during initialization of the first computing environment 102, the cryptographic library 104 determines that the cryptographic processor is accessible or otherwise available to the second computing environment to execute the cryptographic operation 132.

In addition, the application 108, in an embodiment, stores the data 128 and other information used to execute the cryptographic operation 132 in a buffer or other area of memory that is read or otherwise accessed by the cryptographic library 104 to generate the packet 126. In one example, in response to obtaining the packet 126, the second computing environment 120 encrypts the buffer and returns a status in the packet 126 to the first computing environment 102 indicating a status of the cryptographic operation 132 (e.g., completed, incomplete, error, etc.). Furthermore, at least a portion of the information included in the packet 126, in an embodiment, is used for successive cryptographic operations. For example, as a result of the data 128 being larger than the packet size and/or buffer size, an encryption and/or decryption operation on the data 128 is split between a plurality of packets causing the second computing environment to execute a plurality of cryptographic operations. In this example, information such as the pointer, offset, cryptographic key 122, or other information included in the packet 126 is maintained during the plurality of cryptographic operations.

In various embodiments, the second computing environment performs the cryptographic operation 132 and returns the status information (e.g., an indication that the operation completed successfully) to the cryptographic library 104, and the cryptographic library returns the data 128 and/or a pointer to the data 128. Furthermore, in some embodiments, the cryptographic library performs various clean-up operations once the status update is returned from the second computing environment 120. For example, the cryptographic library 104 deletes the cryptographic key 122 or other data from memory, processes error information indicated in the status, or otherwise prepares the first computing environment to execute additional instructions.

In one example, the cryptographic library 104 includes instructions that, as a result of being executed, prepare or otherwise set up the second computing environment 120 to perform the cryptographic operation. For example, a set key function, as a result of being executed, causes the cryptographic library 104 to generate the packet 126 including a function code indicating the set key function. In some embodiments, the packet 126 also includes an initialization vector or other data used to generate the key. In other embodiments, the packet 126 includes the cryptographic key 122. In various embodiments, the packet 126 (e.g., indicating the set key operation) is provided to the second computing environment 120 (e.g., via the IP or other emulated processor) and the second computing environment 120 generates or otherwise stores the cryptographic key 122 in a memory location. In addition, in such embodiments, the second computing environment 120 returns a status to the cryptographic library indicating whether the set key operation completed successfully. In one example, the status information includes identification information for the cryptographic key 122 that the cryptographic library 104 includes in successive encryption and/or decryption operations in order to indicate to the second computing environment 120 the corresponding cryptographic key 122 to perform the encryption and/or decryption operations.

In various embodiments, as a result of an error occurring during the cryptographic operation 132, the second computing environment updates the status in the packet 126 to indicate the errors and provides the packet 126 and/or status to the cryptographic library 104, and the cryptographic library processes the error and returns information to the application 108. For example, the second computing environment 120 converts an interrupt to the first computing environment 102 to a status update to the cryptographic library 104 to enable the cryptographic library 104 to process errors. In some embodiments, the status information indicates a location where the error occurred and/or portion of the input that caused the error. Furthermore, in various embodiments, the cryptographic library 104 provides access to the architecture of the second computing environment 120 by at least translating instructions from the first computing environment 102 to instructions of the second computing environment 120.

Figure 2:
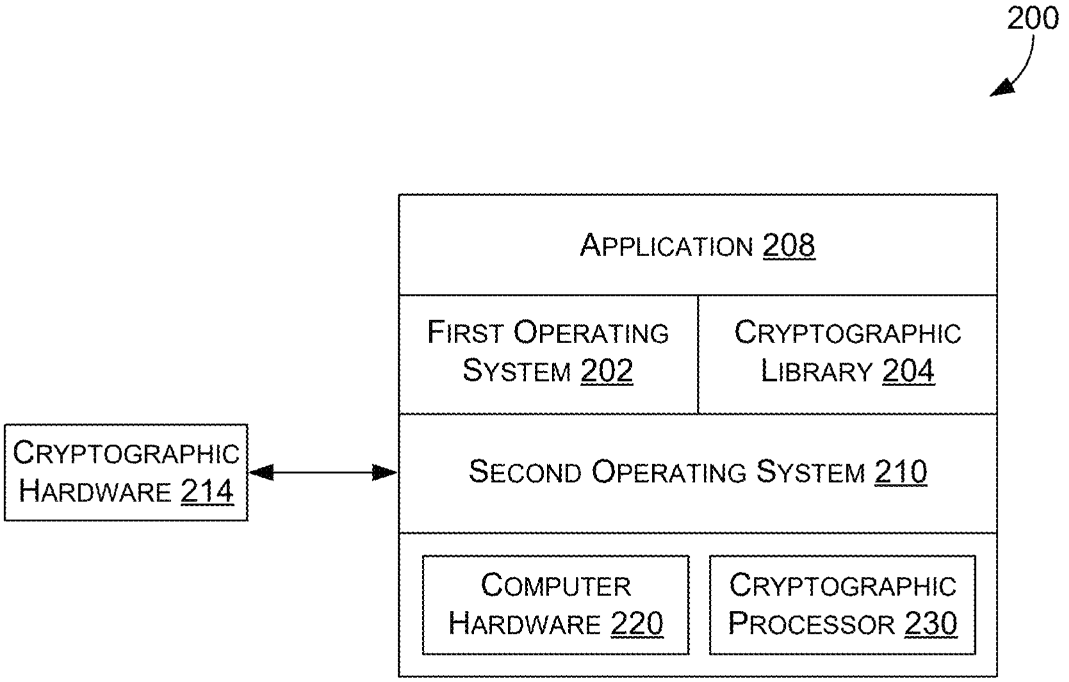
FIG. 2 depicts an environment in which a cryptographic library provides a first computing environment with access to cryptographic hardware of a second computing environment, in accordance with at least one embodiment.

FIG. 2 shows a block diagram of environment 200 in which a cryptographic library 204 provides access to a cryptographic processor 230 in accordance with at least one embodiment. In the illustrated example, a first operating system 202 (e.g., an operating system executing within a first computing environment) is executing on emulated processors (e.g., IPs) for supporting execution of an application 208. In various embodiments, a host system of FIG. 2 (e.g., the server computer system executing the component illustrated) includes computer hardware 220 (e.g., processors, memory, storage, etc.) that is used to support or otherwise execute a second operating system 210 that provides the emulated processors.

In various embodiments, a binding between emulated processors and processors of the computer hardware 220 is performed, which causes operations and/or instructions provided to the emulated processor to be bound to the corresponding processor (e.g., physical processor) of the computer hardware 220. For example, the binding is created during initialization of the emulated processor using an affinity parameter. Accordingly, in various embodiments, through such binding, a task manager (e.g., the first operating system 202) running on an emulated processor may use affinity-based dispatching algorithms for controlling operation assignments.

In various embodiments, the first operating system 202 is executing in a child partition of the second operating system. For example, virtualization service client is a program that executes in a computer system emulator (e.g., a virtual machine or software container) on the host system and coordinates with a virtualization service provider to request and obtain access to the computer hardware 220, storage, network, or other resources of the host system for the computer system emulator. In various embodiments, the first operating system 202 and/or application 308 utilizes computer hardware 220 that is provided by the second operating system 210 or component thereof, such as the virtualization service provider executing in a parent partition (e.g., the second computing environment). For example, the first operating system 202 communicates with the second operating system 210 a virtual memory bus, input output processor, or other virtualized computer hardware to process requests generated by the first operating system 202, cryptographic library 204, and/or application 208. In various embodiments, a hypervisor executes between computer hardware 220 and one or more operating systems that run in partitions (e.g., a first computing environment and a second computing environment). For example, the hypervisor creates and manages isolated execution environments (e.g., partitions), and provides the isolated execution environments with a portion of computer hardware 220, such as memory, devices, and processor cycles.

Furthermore, in various embodiments, the computer hardware 220 includes a cryptographic processor 230. For example, the cryptographic processor 230 includes a separate processor of the computer hardware 220, such as a central processing unit (CPU) or GPU, that is used to perform cryptographic operations. In other examples, the cryptographic processor is a processor of the computer hardware 220 that includes hardware and/or software acceleration of cryptographic operations, such as a processor capable of executing AES-NI instructions. In addition, the host system, in the example illustrated in FIG. 2, includes cryptographic hardware 214. In one example, the cryptographic hardware 214 includes a hardware security module (HSM) that is a hardened, tamper-resistant hardware device that secures cryptographic processes by generating, protecting, and managing keys used for encrypting and decrypting data and creating digital signatures and certificates. In one example, the set key operation of the cryptographic library 204 causes the cryptographic hardware 214 to generate cryptographic keys for use in encrypting and decrypting data maintained by the application 208.

In various embodiments, the first operating system 202 executes using a plurality of emulated processors. For example, a set key operation, an encrypt operation, and a decrypt operation generated by the cryptographic library 204 can be provided separate emulated processors. Continuing this example, once an operation is provided to a particular emulated processor, as described above, the operation is bound to the emulated processor and corresponding physical processor of the computer hardware 220.

In various embodiments, the second operating system 210 maintains the cryptographic keys in memory. For example, the cryptographic hardware 214 is emulated by the second operating system 210. Continuing this example, the second operating system 210 stores the cryptographic keys and/or other data used to perform the cryptographic operations in a memory structure and provides the cryptographic library with identification information that the cryptographic library 204 uses on subsequent operations so that the second operating system utilizes the correct cryptographic keys and/or other data used to perform the cryptographic operations. In other examples, processing the cryptographic operations is done without the use of the cryptographic hardware 214.

Figure 3:
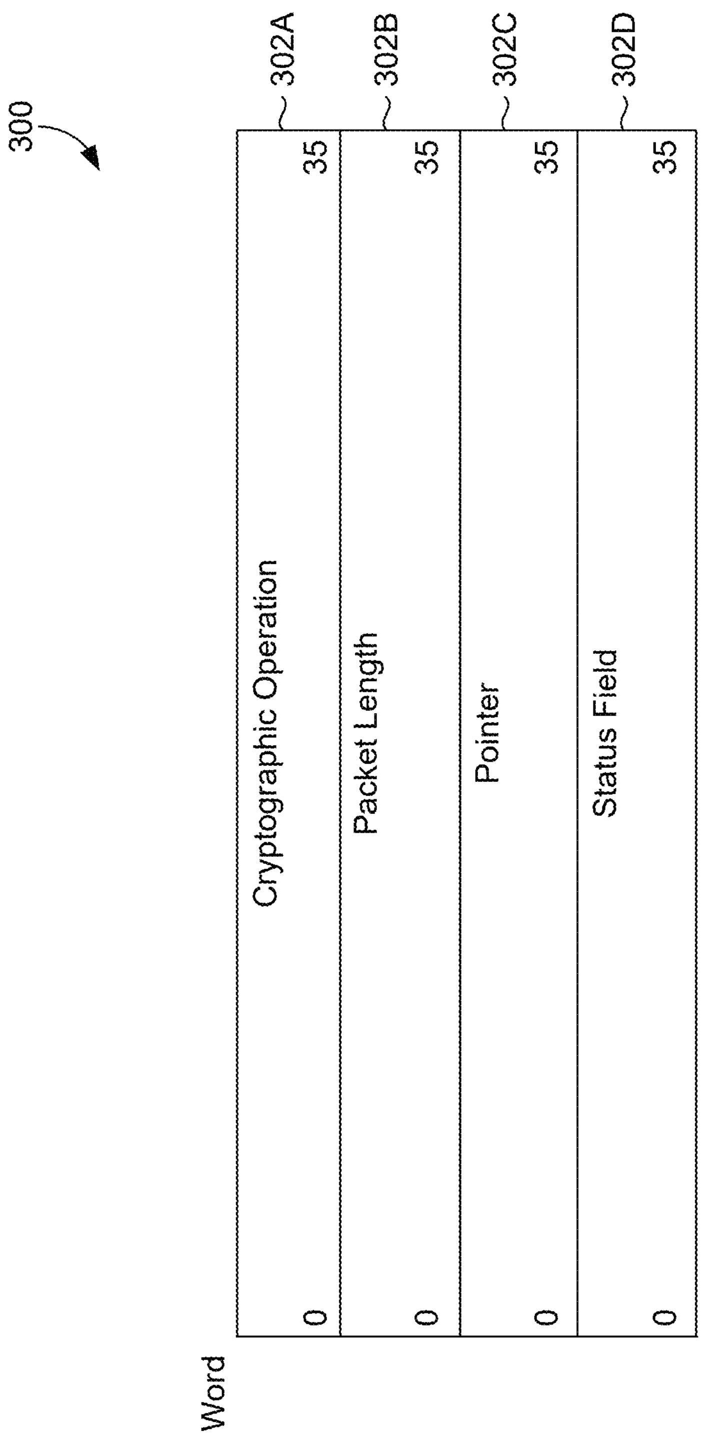
FIG. 3 depicts a packet interface in which information used to perform cryptographic operations is encoded, in accordance with at least one embodiment.

FIG. 3 shows an example of packet 300, which is used to encode a cryptographic operation in accordance with at least one embodiment. In various embodiments, the packet 300 is generated by a cryptographic library or other component of a first computing environment, as described above in connection with FIGS. 1 and 2. For example, the packet 300 is generated in response to an instruction and/or request from an application executing within the first computing environment to perform a cryptographic operation. Furthermore, in an embodiment, the packet 300 is provided to a second computing environment with access to a cryptographic processor or other hardware capable of accelerating the cryptographic operation relative to a software implementation of the cryptographic operation.

In various embodiments, the packet includes a plurality of words 302A-302D, which include a fixed-size unit of data that the emulated processor is capable of processing. For example, the emulated processor is associated with a first instruction architecture that defines the size of a word. In various embodiments, the plurality of words 302A-302D are used to store data (e.g., a buffer of the data used during the cryptographic operation such as a cryptographic key and/or data to be encrypted or decrypted) and instructions (e.g., an indication of the cryptographic operation) in memory. In one example, the emulated processor of the first computing environment obtains, decodes, and executes instructions based on a word size (e.g., the fixed-size associated with the plurality of words 302A-302D).

In various embodiments, the packet 300 includes a first word 302A that includes an operation code that indicates the cryptographic operation. In one example, the cryptographic operations include a "set key," "encrypt operation," and "decrypt operation." In this example, the set key operation, as a result of being executed by the second computing environment, generates a set of expanded keys (e.g., encryption and decryption keys) based on an input key. Continuing this example, the encrypt operation, as a result of being executed by the second computing environment, causes a sequence of bytes to be encrypted using a cryptographic key and stores the encrypted (e.g., cipher text) output to a separate specified memory location. Lastly, in this example, the decrypt operation, as a result of being executed by the second computing environment, causes a sequence of bytes to be decrypted and stores the decrypted (e.g., clear text) output to a separate specified memory location. In various embodiments, the memory location is determined by the second computing environment and indicated to the cryptographic library in a status returned by the second computing environment in response to processing the packet 300. In other embodiments, the packet 300 includes a pointer to the data (e.g., the data to be encrypted or decrypted), and the second computing environment performs the cryptographic operation in place (e.g., the memory location indicated in the pointer is used to store the result of the cryptographic operation).

In various embodiments, the packet 300 includes a second word 302B that indicates the length of that packet 300. For example, the second word 302B indicates a length of the packet 300 in a number of words (e.g., relative to the first computing environment). In various embodiments, the packet 300 includes a third word 302C that includes a pointer to the data to be used in the cryptographic operation indicated in the first word 302A. For example, the pointer includes a virtual address indicating a length of the segment and/or block of memory including the data, a base-displacement index which includes the memory location and a displacement and/or offset, and/or an offset that includes a value that specifies a distance from a base memory address.

In various embodiments, the pointer (e.g., the data included in the third word 302C) indicates a location of the cryptographic key and input and output data structures (e.g., for storing the data used during the cryptographic operation and result of the cryptographic operation). In one example, the pointer includes a two-word (e.g., 72-bit) structure with a location (e.g., virtual address) in the first word and a bit-word pointer in the second word. Continuing this example, the bit-word portion includes a starting bit offset (e.g., 0, 9, 18, 27, etc.) in the first six bits of the word and a word offset in the lower 24 bits of the word.

In various embodiments, the packet 300 includes a fourth word 302D that includes a status field that is used by the second computing environment to indicate a status of the cryptographic operation indicated in the first word 302A. In one example, the fourth word 302D is reserved such that the emulated processor (e.g., IP) does not store data in the fourth word 302D. Continuing this example, this allows the second computing environment (e.g., the host operating system) to store status information in the fourth word 302D and return status information to the first computing environment or component thereof, such as the cryptographic library. In various embodiments, an error status is included in the fourth word 302D based on an interrupt or other error generated by an instruction generated by the second computing environment based on the packet 300. In various embodiments, the fourth word 302D is initialized and used to pass status information between the second computing environment (e.g., host operating system) and the first computing environment (e.g., guest operating system).

Furthermore, in various embodiments, the cryptographic library performs various validation checks based on the packet 300. For example, the cryptographic library checks the pointer to determine whether there are sufficient access privileges to the data to perform the cryptographic operation indicated in the first word 302A. In addition, in various embodiments, the cryptographic library formats the packet 300 and the data included in the packet 300. For example, the cryptographic library formats the packet 300 such that the packet contains four nine-bit bytes in one 36-bit word (e.g., words 302A-302D), where the most significant bit of each byte is ignored on input and cleared on output (e.g., reserved).

FIG. 4 is a flow diagram showing a method 400 for generating a cryptographic key in accordance with at least one embodiment. The method 400 can be performed, for instance, by the cryptographic library 104 of FIG. 1. Each block of the methods 400 and 500 (described below) and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

As shown at block 402, the system implementing the method 400 obtains a request to generate a cryptographic key. As described above in connection with FIG. 1, in various embodiments, an application executing in a first computing environment provides a request to the cryptographic library to generate a cryptographic key. In some embodiments, the cryptographic key is already generated, and the request initializes the computer system (e.g., a server computer system supporting the first computing environment and the second computing environment) to perform cryptographic operations. For example, the request causes the cryptographic library, first computing environment, and/or second computing environment to perform set-up operations to perform an encrypt or decrypt operation using a cryptographic key.

At block 404, the system implementing the method 400 generates a packet for a host operating system. For example, as described above, the cryptographic library generates a packet that indicates the set-up operation and provides additional data used by the host operating system to initialize computer hardware to perform a cryptographic operation. At block 406, the system implementing the method 400 provides the packet to the host operating system.

For example, the cryptographic library provides the packet to an emulated processor provided by the host operating system. At block 408, the system implementing the method 400 obtains status information from the host operating system. In one example, as described above, a portion of the packet is updated to include the status information associated with the cryptographic operation and returned to the cryptographic library.

Figure 5:
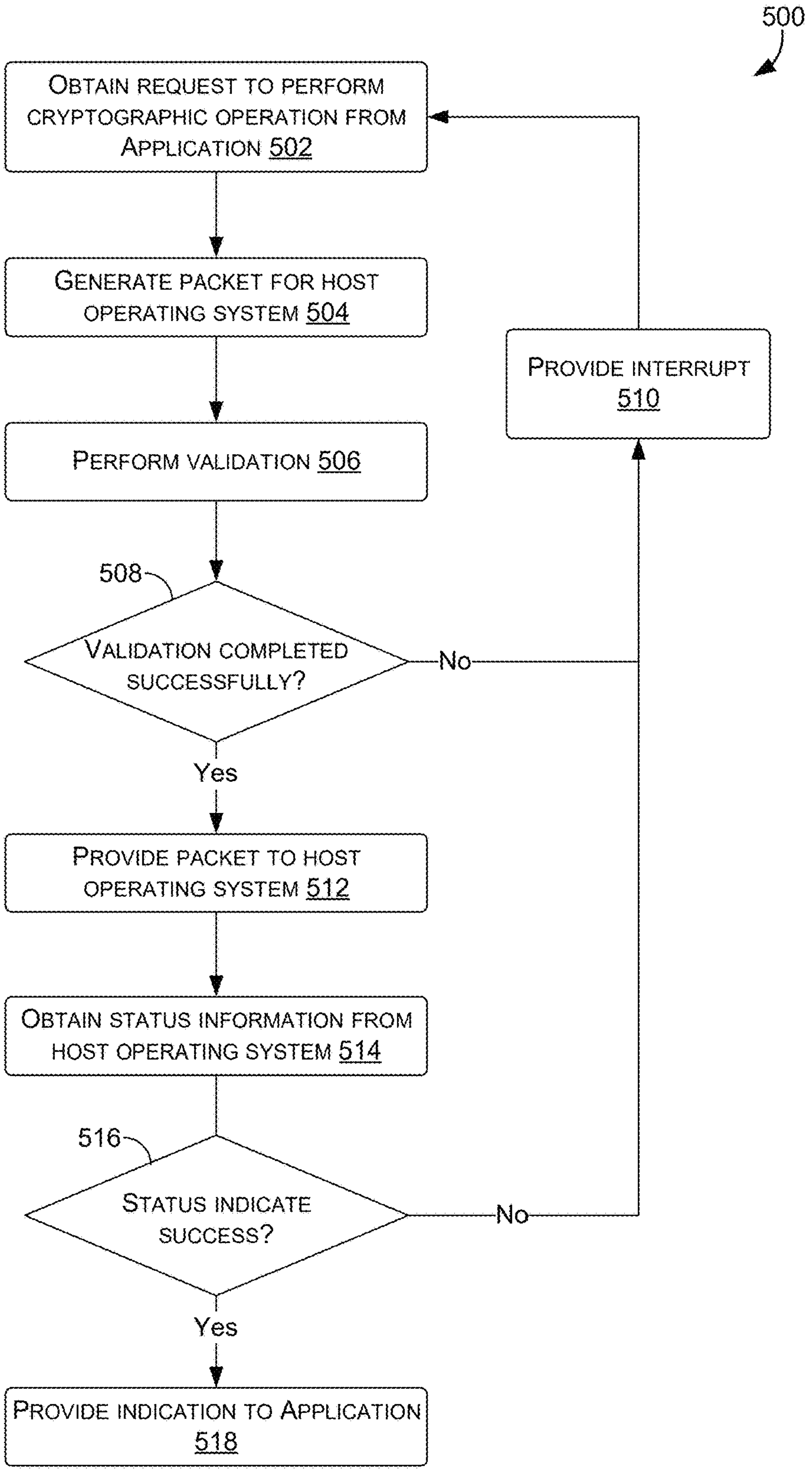
FIG. 5 depicts an example process flow for executing cryptographic operations, in accordance with at least one embodiment.

FIG. 5 is a flow diagram showing a method 500 for performing a cryptographic operation in accordance with at least one embodiment. The method 500 can be performed, for instance, by the cryptographic library 104 of FIG. 1. As shown at block 502, the system implementing the method 500 obtains a request to perform a cryptographic operation. As described above in connection with FIG. 1, in various embodiments, an application executing in a first computing environment provides a request to the cryptographic library to encrypt and/or decrypt data associated with the application.

At block 504, the system implementing the method 500 generates a packet for a host operating system. For example, as described above, the cryptographic library generates a packet that indicates the cryptographic operation and provides additional data used by the host operating system to perform a cryptographic operation. Continuing this example, the packet includes a pointer to the data used to perform the cryptographic operation and an indication of a cryptographic key to a user during the cryptographic operation (e.g., the cryptographic key generated using the method 500 described above in connection with FIG. 4). At block 506, the system implementing the method 500 provides validation of the packet. For example, the cryptographic library determines that the data is accessible (e.g., includes read and write access).

At block 508, if validation is not completed successfully, the system implementing the method 500 continues to block 510 and provides an interrupt to the cryptographic library. For example, the interrupt indicates an error and enables the cryptographic library to handle or otherwise process the error without the first operating system terminating the application. Returning to block 508, if the validation is completed successfully, the system implementing the method 500 continues to block 512.

At block 512, the system implementing the method 500 provides the packet to the host operating system. For example, the cryptographic library provides the packet to an emulated processor provided by the host operating system. At block 514, the system implementing the method 500 obtains status information from the host operating system. In one example, as described above, a portion of the packet is updated to include the status information associated with the cryptographic operation and returned to the cryptographic library. At block 516, the system implementing the method 500 determines if the status indicates that the cryptographic operation was completed successfully. If the cryptographic operation did not complete successfully, the system implementing the method 500 continues to block 510, as described above. However, if the cryptographic operation did complete successfully, the system implementing the method 500 continues to block 518 and provides an indication to the application. In one example, the cryptographic library returns execution to the application, thereby enabling the application to continue execution.

Figure 6:
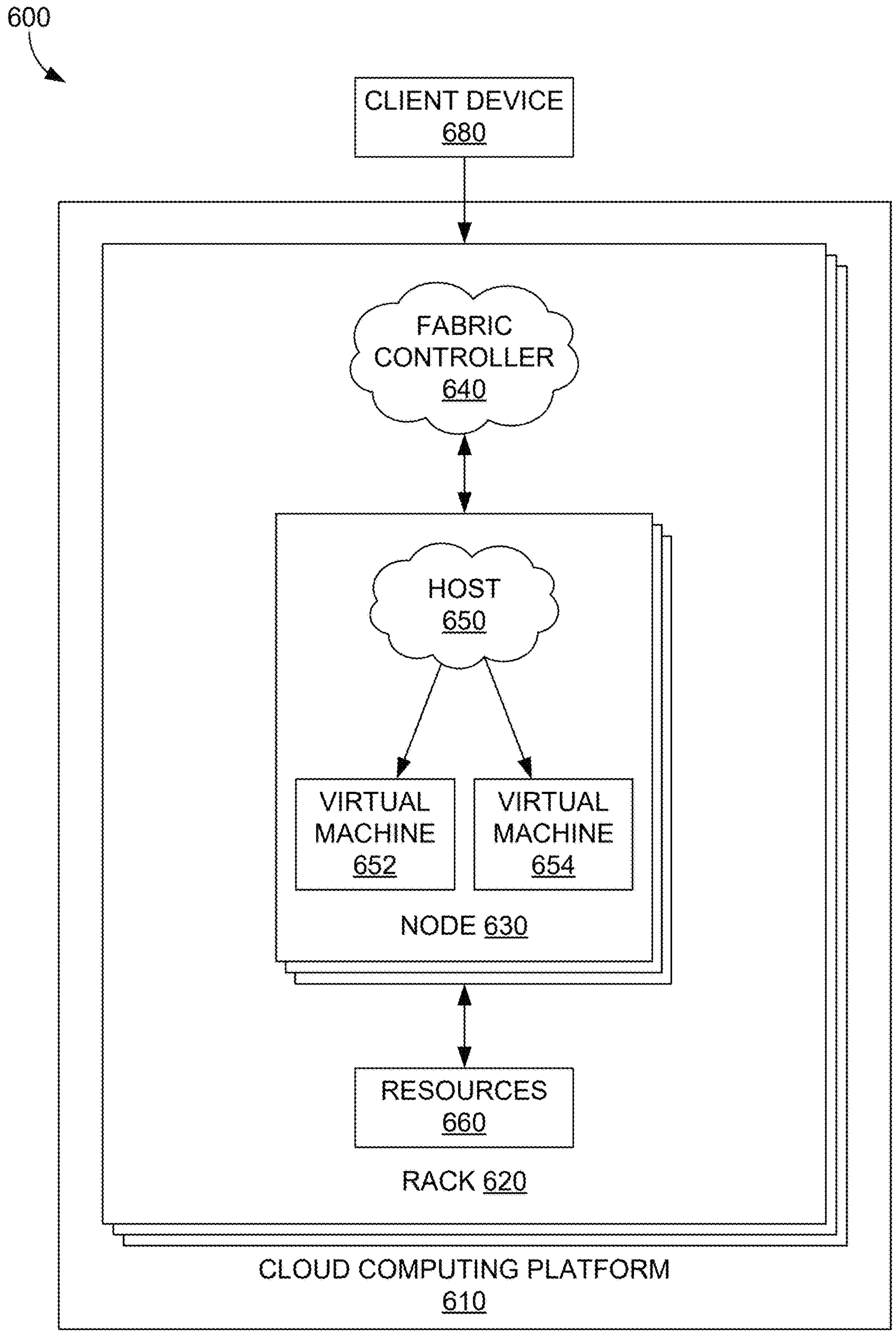
FIG. 6 provides a block diagram of an exemplary distributed computing environment suitable for use in accordance with at least one embodiment.

Referring now to FIG. 6, FIG. 6 illustrates an example distributed computing environment 600 in which implementations of the present disclosure may be employed. In particular, FIG. 6 shows a high-level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement a fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a multitenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 700 described with reference to FIG. 7—for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Figure 7:
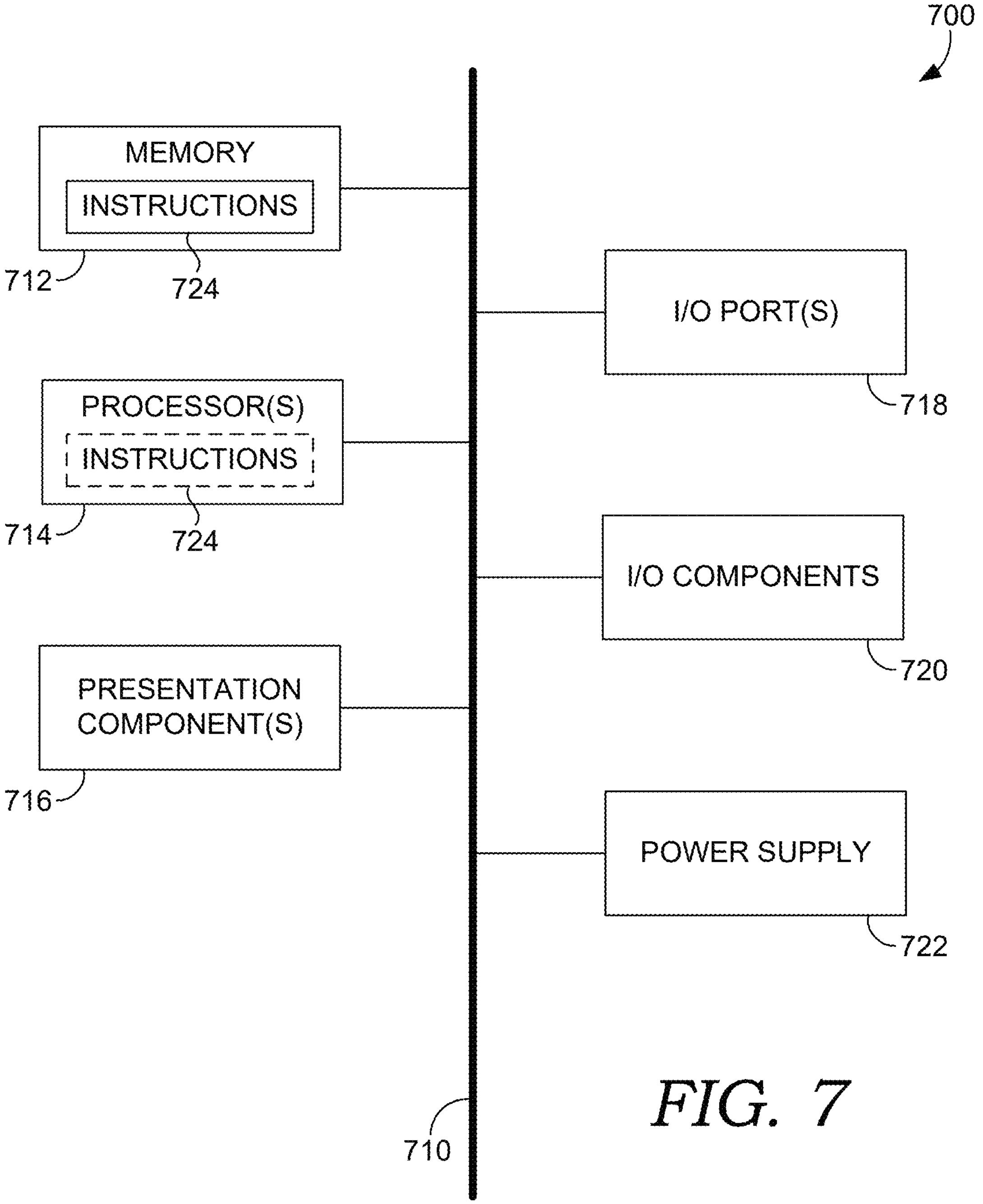
FIG. 7 is a block diagram of an exemplary computing environment suitable for use in implementations of the present disclosure.

Having described embodiments of the present disclosure, FIG. 7 provides an example of a computing device in which embodiments of the present disclosure may be employed. Computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more buses (such as an address bus, data bus, or combination thereof). Although the various blocks of FIG. 7 are shown with lines for the sake of clarity, in reality, delineating various components is not so clear, and metaphorically, the lines would more accurately be gray and fuzzy. For example, one may consider a presentation component such as a display device to be an I/O component. Also, processors have memory. The inventors recognize that such is the nature of the art and reiterate that the diagram of FIG. 7 is merely illustrative of an exemplary computing device that can be used in connection with one or more embodiments of the present technology. Distinction is not made between such categories as "workstation," "server," "laptop," "handheld device," etc., as all are contemplated within the scope of FIG. 7 and make reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, random access memory (RAM), read-only memory (ROM), electrically erasable programmable read-only memory (EEPROM), flash memory or other memory technology, digital versatile disks (DVDs) or other optical disk storage, magnetic cassettes, magnetic tape, magnetic disk storage or other magnetic storage devices, or any other medium that can be used to store the desired information and which can be accessed by computing device 700. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, infrared, and other wireless media. Combinations of any of the above should also be included within the scope of computer-readable media.

Memory 712 includes computer storage media in the form of volatile and/or nonvolatile memory. As depicted, memory 712 includes instructions 724. Instructions 724, when executed by processor(s) 714, are configured to cause the computing device to perform any of the operations described herein, in reference to the above discussed figures, or to implement any program modules described herein. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built-in. Illustrative components include a microphone, joystick, game pad, satellite dish, scanner, printer, wireless device, etc. I/O components 720 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on computing device 700. Computing device 700 may be equipped with depth cameras, such as stereoscopic camera systems, infrared camera systems, other camera systems, and combinations of these, for gesture detection and recognition. Additionally, computing device 700 may be equipped with accelerometers or gyroscopes that enable detection of motion. The output of the accelerometers or gyroscopes may be provided to the display of computing device 700 to render immersive augmented reality or virtual reality.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order to not obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B, and C" means "(A), (B), (C), (A and B), (A and C), (B and C), or (A, B, and C)."

What is claimed is:

1. A method comprising:

instantiating, in a guest computing environment, an emulated processor to execute operations of a guest operating system executing within the guest computing environment;

obtaining a request to perform a cryptographic operation, the request provided by an application;

generating a packet including an indication of the cryptographic operation, a pointer to a memory location including data used during execution of the cryptographic operation, a length of the data, and a status field;

validating the packet by at least determining access privileges associated with the data;

providing the packet to a host operating system within a host computing environment, the host operating system supporting the guest computing environment;

obtaining the packet from the host operating system including an update to the status field included in the packet;

determining based on the update, a status of the cryptographic operation; and providing information indicating the status of the cryptographic operation to the application executing within the guest environment.

2. The method of claim 1, wherein providing the packet to the host operating system further comprises providing the packet to the emulated processor to process as an instruction.

3. The method of claim 1, wherein the indication of the cryptographic operation maps a single cryptographic operation within the guest computing environment to a plurality of cryptographic operations within the host computing environment.

4. The method of claim 3, wherein the plurality of cryptographic operations further comprise a set of hardware instructions in a first instruction architecture that, as a result of being executed, cause the cryptographic operation to be completed faster relative to a second instruction architecture associated with the emulated processor.

5. The method of claim 3, wherein a cryptographic library generates the plurality of cryptographic operations.

6. The method of claim 1, wherein the pointer includes an address and an offset.

7. The method of claim 1, wherein the method further comprises formatting data included in the packet by at least converting from a nine-bit format to an eight-bit format.

8. One or more computer storage media storing executable instructions embodied thereon, that, as a result of being executed by a processing device, cause the processing device to perform operations comprising:

obtaining, from an application, a request to perform a cryptographic operation, the application executed within a first computing environment including an emulated processor;

in response to the request, generating a packet including an indication of the cryptographic operation, a pointer to data used during execution of the cryptographic operation, and a status associated with the cryptographic operation;

providing the packet through the emulated processor to a host operating system within a second computing environment, the host operating system supporting the first computing environment by at least providing the emulated processor;

causing a processor of the second computing environment to perform the cryptographic operation using the data indicated by the pointer without copying the data from the first computing environment;

obtaining, from the host operating system, the packet including information indicating the status associated with the cryptographic operation; and providing the information indicating the status of the cryptographic operation to the application.

9. The one or more computer storage media of claim 8, wherein the packet further comprises identification information associated with a cryptographic key to use during execution of the cryptographic operation.

10. The one or more computer storage media of claim 9, wherein the indication of the cryptographic operation further comprises at least one of: a set key operation, an encrypt operation, and a decrypt operation.

11. The one or more computer storage media of claim 9, wherein the host operating system maintains the cryptographic key.

12. The one or more computer storage media of claim 9, wherein the host operating system utilizes the cryptographic key for a plurality of cryptographic operations indicated in a plurality of packets, where the packet is a member of the plurality of packets.

13. The one or more computer storage media of claim 8, wherein the status information indicates that the cryptographic operation did not complete successfully.

14. The one or more computer storage media of claim 13, wherein the first computing environment processes the status information indicating that the cryptographic operation did not complete successfully prior to providing the status information to the application such that the application continues execution.

15. The one or more computer storage media of claim 8, wherein the request includes a single instruction to perform the cryptographic operation, and the indication of the cryptographic operation causes the host operating system to perform a plurality of cryptographic operations.

16. A system comprising:

a memory component; and a processing device coupled to the memory component, the processing device to perform operations comprising:

obtaining a request to perform a cryptographic operation in a first computing environment executing on an emulated processor, the request generated by an application;

generating a packet including an indication of the cryptographic operation, a pointer to data used during execution of the cryptographic operation including a memory address and an offset within the first computing environment, a length of the packet, and a status associated with the cryptographic operation;

validating the packet by determining that the second computing environment is permitted to access the memory address;

providing the packet through the emulated processor to a host operating system within a second computing environment, the host operating system providing the emulated processor;

in response to obtaining the packet, causing the second computing environment to perform the cryptographic operation on the data at the memory address indicated by the pointer without copying the data into the second computing environment;

obtaining the packet including a second status associated with the cryptographic operation; and resuming execution of the application.

17. The system of claim 16, wherein the set of instructions include a plurality of hardware-accelerated instructions for performing cryptographic operations associated with a cryptographic algorithm.

18. The system of claim 17, wherein the operations further comprise determining that the second computing environment includes computer hardware capable of executing the plurality of hardware-accelerated instructions.

19. The system of claim 16, wherein the second status associated with the cryptographic operation indicates that the cryptographic operation did not complete successfully.

20. The system of claim 19, wherein the operations further comprise providing the second status to the application without terminating execution of the application.

* * * * *